United States Patent
Schreiber et al.

(10) Patent No.: US 10,302,180 B2
(45) Date of Patent: May 28, 2019

(54) DRIVE CABLE FOR ACTUATING A VEHICLE ELEMENT

(71) Applicants: Webasto SE, Stockdorf (DE); Küster Automotive GmbH, Ehringshausen (DE)

(72) Inventors: Ulrich Schreiber, Stockdorf (DE); Gunter Reinhardt, Aßlar (DE)

(73) Assignees: WEBASTO SE, Stockdorf (DE); KÜSTER AUTOMOTIVE GMBH, Ehringshausen (DE)

( * ) Notice: Subject to any disclaimer, the term of this patent is extended or adjusted under 35 U.S.C. 154(b) by 0 days.

(21) Appl. No.: 15/551,851

(22) PCT Filed: Mar. 14, 2016

(86) PCT No.: PCT/EP2016/055460
§ 371 (c)(1),
(2) Date: Aug. 17, 2017

(87) PCT Pub. No.: WO2016/146589
PCT Pub. Date: Sep. 22, 2016

(65) Prior Publication Data
US 2018/0031087 A1    Feb. 1, 2018

(30) Foreign Application Priority Data

Mar. 18, 2015  (DE) .................. 10 2015 104 068

(51) Int. Cl.
*F16H 19/08*     (2006.01)
*F16H 7/00*      (2006.01)
(Continued)

(52) U.S. Cl.
CPC .............. *F16H 19/08* (2013.01); *F16C 1/20* (2013.01); *F16H 7/00* (2013.01); *F16H 19/005* (2013.01);
(Continued)

(58) Field of Classification Search
CPC .... F16C 1/00; F16C 1/20; F16C 1/205; F16C 1/26; F16C 1/267; F16H 7/00; F16H 9/00;
(Continued)

(56) References Cited

U.S. PATENT DOCUMENTS

| 2,956,305 A | 10/1960 | Raydt et al. |
| 4,716,001 A * | 12/1987 | Kottke ...................... F16C 1/26 |
| | | 156/195 |

(Continued)

FOREIGN PATENT DOCUMENTS

| DE | 659050 C | 4/1938 |
| DE | 7136899 U | 1/1972 |

(Continued)

OTHER PUBLICATIONS

International Search Report for PCT/EP2016/055460 dated Aug. 26, 2016; English translation submitted herewith (5 Pages).

(Continued)

*Primary Examiner* — Prasad V Gokhale
(74) *Attorney, Agent, or Firm* — Fitch, Even, Tabin & Flannery, LLP (57) ABSTRACT

A drive cable for actuating a vehicle element which is movable with respect to a vehicle design, which can have a cable body having a flexible cable core which is wrapped with a spiral, which follows a helical line so as to become engaged with a gearwheel. At least three longitudinal ribs or crosspieces can be formed along the periphery of the cable body, said drive cable being able to support itself in a cable guide via said longitudinal ribs which form at least mostly continuous guiding lines and contact lines of the drive cable, each having the same distance all around to the cable axis. Alternatively, an elastically or plastically malleable cable jacket can be provided which engages over the cable core (Continued)

and the spiral and which forms a cylindrical and rib-free peripheral surface of the cable when the cable core is stretched.

17 Claims, 11 Drawing Sheets (51) Int. Cl.
*F16H 19/00* (2006.01)
*F16H 19/06* (2006.01)
*F16C 1/20* (2006.01)

(52) U.S. Cl.
CPC ..... *F16H 19/0645* (2013.01); *F16H 19/0654* (2013.01); *F16H 2019/085* (2013.01)

(58) Field of Classification Search
CPC ...... F16H 19/00; F16H 19/003; F16H 19/005; F16H 19/006; F16H 19/06; F16H 19/0618; F16H 19/0622; F16H 19/0645; F16H 19/0654; F16H 19/08; F16H 2019/085
See application file for complete search history.

(56) References Cited

U.S. PATENT DOCUMENTS

| | | | | |
|---|---|---|---|---|
| 5,577,416 | A | * | 11/1996 | Fukura ................. B29C 44/322 49/352 |
| 2003/0196508 | A1 | * | 10/2003 | Uenaka ................. D07B 1/0693 74/502.5 |
| 2007/0209467 | A1 | * | 9/2007 | Honda .................. E05F 11/426 74/500.5 |
| 2012/0277047 | A1 | * | 11/2012 | Inoue ........................ F16C 1/16 474/239 |
| 2013/0000427 | A1 | * | 1/2013 | Stenzel .................... F16C 1/14 74/30 |
| 2013/0291665 | A1 | | 11/2013 | Rodenhauser |
| 2014/0260765 | A1 | * | 9/2014 | Granda .................. F16C 1/267 74/502.5 |
| 2018/0017096 | A1 | * | 1/2018 | Jusick .................... F16C 1/108 |

FOREIGN PATENT DOCUMENTS

| | | |
|---|---|---|
| DE | 3042234 A1 | 6/1982 |
| DE | 3319697 A1 | 12/1984 |
| DE | 102010055809 B4 | 9/2012 |
| JP | 2004019732 A | 1/2004 |

OTHER PUBLICATIONS

International Preliminary Report on Patentability issued against International Application No. PCT/EP2016/055460 dated Sep. 19, 2017.

* cited by examiner

DRIVE CABLE FOR ACTUATING A VEHICLE ELEMENT

CROSS-REFERENCE TO RELATED APPLICATIONS

This application is a U.S. national phase application filed under 35 U.S.C. § 371 of International Application No. PCT/EP2016/055460, filed Mar. 14, 2017, designating the United States, which claims priority from German Patent Application No. 10 2015 104 068.9, filed Mar. 18, 2015, which are hereby incorporated herein by reference in their entirety for all purposes.

FIELD

The invention relates to a drive cable for actuating a vehicle element which is movable with respect to a vehicle design, having the features of the preamble of claim 1.

Such a drive cable is known from practice and serves, for example, for actuating a lid element of a sliding-roof arrangement, by means of which a roof opening of the respective vehicle can be closed or at least partially released as desired. The drive cable, which is arranged in a cable guide, transfers a drive torque from a drive motor to the movable vehicle element.

BACKGROUND

A drive cable realized as a helical cable for a movable vehicle element is known from DE 10 2010 055 809 B4. This drive cable comprises a cable body which is realized having a flexible cable core wrapped with a spiral following a helical line. The spiral works like a toothing and can be engaged with a drive gearwheel driven by a drive motor. In order to reduce noise generated by actuating the drive cable, the drive cable is additionally provided with a flock. The flock, however, is subject to wear during the service life of the drive cable, which in turn negatively affects the noise behavior of the drive cable. Moreover, the spiral can exhibit an unintended noise behavior at any defective point in the cable guide.

SUMMARY

The object of the invention is to create a drive cable of the type mentioned above which can meet high requirements regarding the noise behavior in the long run.

According to the invention, this object is attained by the drive cable having the features of claim 1.

According to the invention, it is therefore proposed to form at least three longitudinal ribs along the periphery of the cable body, which is a helical cable having a spiral working like a toothing, the drive cable being able to support itself in a cable guide via said longitudinal ribs. The longitudinal ribs form at least mostly continuous guiding lines and contact lines of the drive cable to the cable guide. Thus, possible rattling edges can be avoided. At the same time, the drive cable can be centered in its guide. The longitudinal ribs thus have a silencing effect. Due to the continuous guiding lines, the friction of the drive cable in a guide channel or a cable channel, respectively, is also low. In total, the noise behavior of a drive system provided with the drive cable according to the invention can therefore be significantly reduced as compared to drive systems provided with generic drive cables. Moreover, a tolerance can also be compensated using the ribs.

The longitudinal ribs or crosspieces can be deformed after a gearwheel has engaged, which is why the respective longitudinal rib or the respective crosspiece forms a guiding line and contact line disrupted by the deformation. This guiding line and contact line is then only mostly continuous. Before the gearwheel has been engaged, all ribs or crosspieces, however, form undisrupted guiding lines and contact lines, which are realized continuously and whose distance to the cable axis is the same all around. The ribs or crosspieces therefore also bridge the gaps between the individual spiral windings.

The guiding lines and contact lines each have the same distance all around to the cable axis. Within the scope of the invention, this constant distance also contains residual ripple and other oscillations, which are due to production and tolerances, for example.

In order to enable a drive gearwheel being able to engage in the toothing of the drive cable formed by the spiral, the ribs are formed from an elastically or plastically malleable plastic in a functional embodiment of the drive cable according to the invention. The ribs are therefore deformed and/or pushed aside as necessary when the drive gearwheel is engaged in order to enable a non-slip actuation of the drive cable. The longitudinal ribs, which are in particular distributed along the periphery of the cable body and which are arranged outside of the engaging area of the drive gearwheel, are not deformed. Indeed, these guiding ribs remain intact so that their guiding function is preserved in the cable guide.

The spiral of the drive cable according to the invention is formed by being wrapped around the cable core. For this purpose, a wire is used, which is wrapped around the cable core by following a helical line.

For this purpose, the plastic material of which the longitudinal ribs are made is chosen so as to not rip during the service life of the drive cable.

In a specific embodiment of the drive cable according to the invention, the longitudinal ribs are arranged parallel to the neutral fiber, i.e. parallel to the longitudinal direction of the cable core. At least six longitudinal ribs are formed in this instance, for example.

In an alternative embodiment, which sees to guiding and supporting the drive cable particularly securely in its guide, the longitudinal ribs each follow a helical line which has a larger inclination than the helical line followed by the spiral with which the flexible cable core is wrapped. With respect to the embodiment having longitudinal ribs arranged parallel to the neutral fiber of the cable core, guiding the drive cable so as to fulfil the requirements can be realized using a smaller number of longitudinal ribs. Moreover, a suitable inclination angle of the longitudinal ribs can prevent producing rattling noises through a transverse load of the longitudinal ribs which can lead to the longitudinal ribs folding. A softer support or a better silencing behavior, respectively, can also be realized with respect to axially arranged longitudinal ribs.

For this purpose, the helical lines followed by the longitudinal ribs are arranged inversely to the helical line followed by the spiral.

In an embodiment of the drive cable according to the invention, which is easily implemented from a production point of view, the longitudinal ribs are components of a jacketing of the cable body.

The jacketing is an extrusion layer, for example, i.e. applied to the cable body according to an extrusion method.

In order to further ameliorate the noise behavior of the drive cable according to the invention upon actuation, filling material can be arranged between the jacketing and the cable body. In particular, the filling material is made of a plastically or elastically malleable material, preferably plastic. The filling material comprises, for example, a flock, a gel, a foam, in particular an open-pored foam, a belt, a cord, a profile cord, a tube and/or the like. The filling material can be applied differently. They can be wrapped or extruded, for example.

According to the invention, it is alternatively proposed to provide the helical cable with a cable jacket which forms a cylindrical and rib-free peripheral surface of the cable when the cable core is stretched, said peripheral surface of the cable being concentrically arranged with respect to the cable axis. Such a cable jacket, whose peripheral surface is realized at least mostly closed, forms a continuous guiding surface of the drive cable in a cable guide. Such a drive cable is free of possible rattling edges, the closed peripheral surface of the cable or the jacketing surface, respectively simultaneously ensuring that the drive cable is centered in the cable guide. Due to the closed guiding surface, the friction of the drive cable in the guide or a cable channel, respectively, can also be kept low. In this embodiment as well, the noise behavior of a drive system provided with the drive cable is thus significantly reduced with respect to drive systems provided with generic drive cables.

The cable jacket can be deformed after a gearwheel has engaged in the drive cable so that the cylindrical and rib-free peripheral surface of the cable is provided with corresponding indentations. However, before the gearwheel is engaged, the peripheral surface of the cable formed by the cable jacket is closed, i.e. formed continuously. The cable jacket surface also bridges gaps between the windings and the spiral.

In order to enable a drive gearwheel being able to engage in the toothing of the drive cable formed by the spiral, the cable jacket is realized so as to be elastically or plastically deformable for this purpose. This can be realized by using a corresponding elastically or plastically deformable plastic. Therefore the cable jacket is deformed as necessary when the drive gearwheel engages in order to enable a non-slip actuation of the drive cable. The cable jacket is deformed only along the area of an axially extending peripheral line, into which the drive gearwheel engages.

In a specific embodiment of the drive cable according to the invention, the cable jacket is formed by a cable sleeve which engages over the spiral. The cable sleeve can be an extrusion layer which is applied onto the helical cable, which consists of the cable core and the spiral, according to an extrusion method using supporting air.

In this embodiment as well, in order to further ameliorate the noise behavior of the drive cable when being actuated, filling material can be arranged between the cable sleeve and the cable core, said filling material being able to be made in particular of a plastically or elastically malleable material, preferably plastic. This filling material comprises, for example, a flock, a gel, a foam, in particular an open-pored foam, a belt, a cord, a seal cord, a tube and/or the like. This filling body can also be applied according to different methods, for example according to a winding method or an extrusion method.

In an alternative embodiment of the drive cable according to the invention, the cable jacket surrounds the cable core and the spiral in such an interlocking manner that the gaps between the spiral windings are filled. Thus, the cable jacket forms a massive sheath of the cable, into which sheath the toothing of a drive gearwheel can engage. A cable jacket formed in such a manner can be made of an elastically or plastically malleable material, preferably plastic.

Further advantages and advantageous embodiments of the invention's subject matter can be taken from the description, the drawing and the claims.

Exemplary embodiments of a drive cable according to the invention are illustrated in the drawing in a schematically simplified manner and are further described in the following description. In the following,

DETAILED DESCRIPTION

Figure 1:
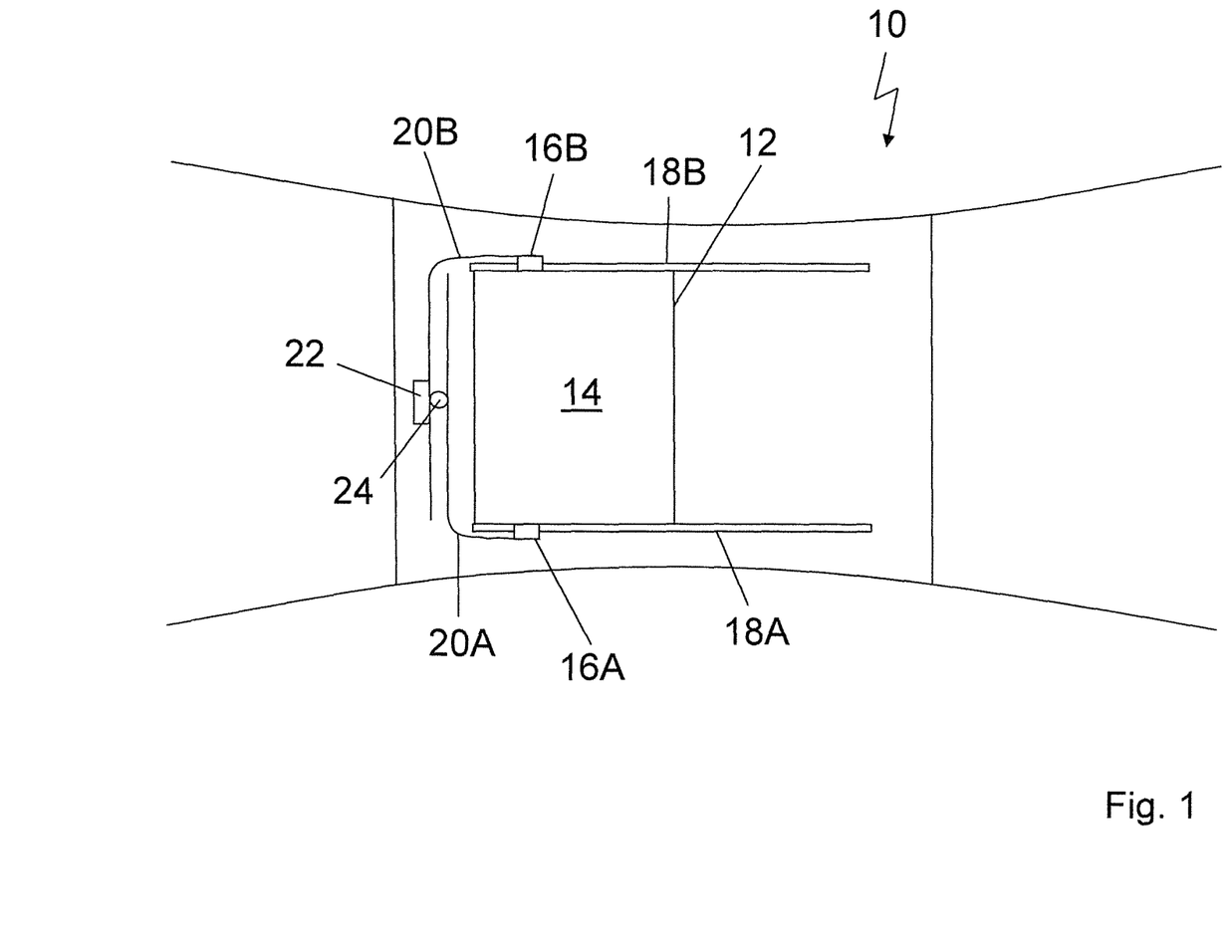
FIG. 1 shows a schematic top view of a vehicle roof having a drive unit for a movable lid element.

In FIG. 1, a vehicle roof 10 of a besides this not further illustrated passenger car is illustrated, comprising a roof opening 12 which can be opened or at least partially released as desired by means of a lid element 14. The lid element 14 is therefore a movable vehicle element as compared to the vehicle design.

In order to be able to displace the lid element 14, the lid element 14 is connected to displacing kinematics which comprises a drive slider 16A and 16B on each of its two sides with respect to a vertical longitudinal center plane of the roof, said drive slider 16A or 16B being guided in a respective guide rail 18A or 18B extending in the longitudinal direction of the roof.

A pressure-resistant drive cable is connected to each drive slider 16A and 16B. The drive cables 20A and 20B are guided to a shared drive motor 22 via respective guide tubes or cable channels and are engaged with a drive gearwheel 24 of the drive motor 22.

The drive cables 20A and 20B are realized as being pressure-resistant and can be realized according to the embodiments illustrated in FIGS. 2 to 22.

Figure 2:
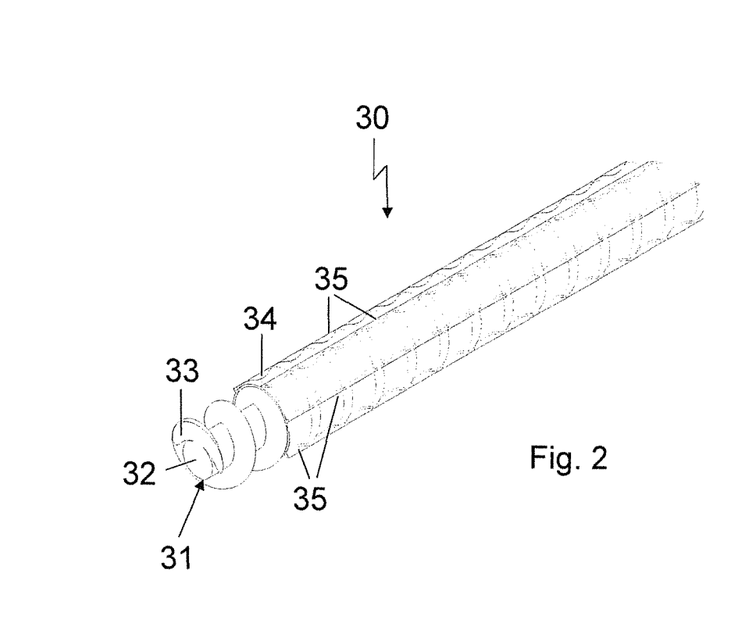
FIG. 2 shows a perspective view of a first embodiment of a drive cable of the drive unit according to FIG. 1.
Figure 3:
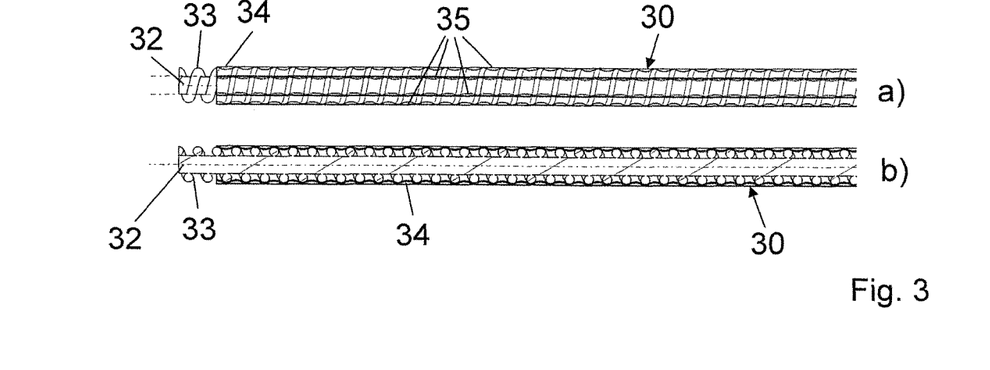
FIG. 3 shows a) a side view of the drive cable and b) a longitudinal cut of the drive cable according to FIG. 2.
Figure 4:
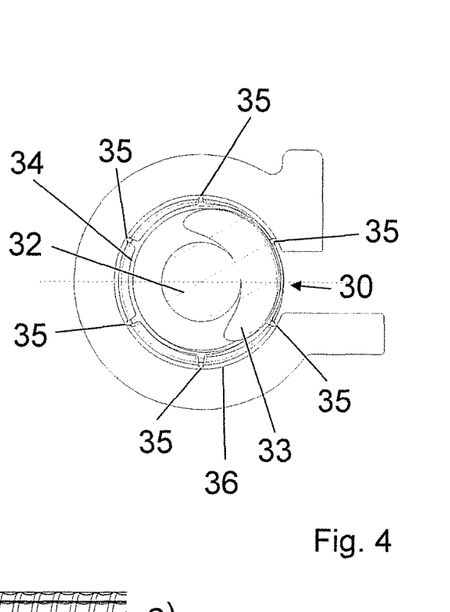
FIG. 4 shows a cross section through the drive cable according to FIG. 2 in a cable channel.

In FIGS. 2 to 4, a drive cable 30 is illustrated which comprises a cable body 31 made of a flexible cable core 32 and a spiral 33 which surrounds the cable core 32 along a helical line. The cable core 32 is either made of a one-piece steel wire or a steel braid. The spiral 33 also consists of a steel wire.

The cable body 31, which consists of the cable core 32 and the spiral 33 and which thus forms a so-called helical cable, is provided with a jacketing 34 which is realized as a plastic extrusion layer.

The jacketing 34, which covers the periphery of the cable body 31, has six longitudinal ribs 35 along its outer side, said longitudinal ribs 35 extending in the axial direction of the cable body 31, i.e. parallel to the neutral fiber of the cable core 32. The longitudinal ribs 35 are distributed on the jacketing 34 at equal distances in the peripheral direction, i.e. the planes of adjacent longitudinal ribs 35 intersect each other at an angle of 60°.

As can be seen in FIG. 4, the drive cable 30 supports itself in a guide channel or cable channel 60 via its longitudinal ribs 35 when installed, said guide channel or cable channel 60 being able to be formed on the guide rails 18A and 18B illustrated in FIG. 1, for example. In the section of the drive cable 30 which becomes engaged with the drive gearwheel 24 of the drive motor 22 while the lid element 14 is actuated, the jacketing 34 is deformed so that the drive gearwheel 24 and the spiral 33 of the cable body 31 can mesh. The jacketing 34 can be either elastically or plastically deformed.

Figures 5, 7:
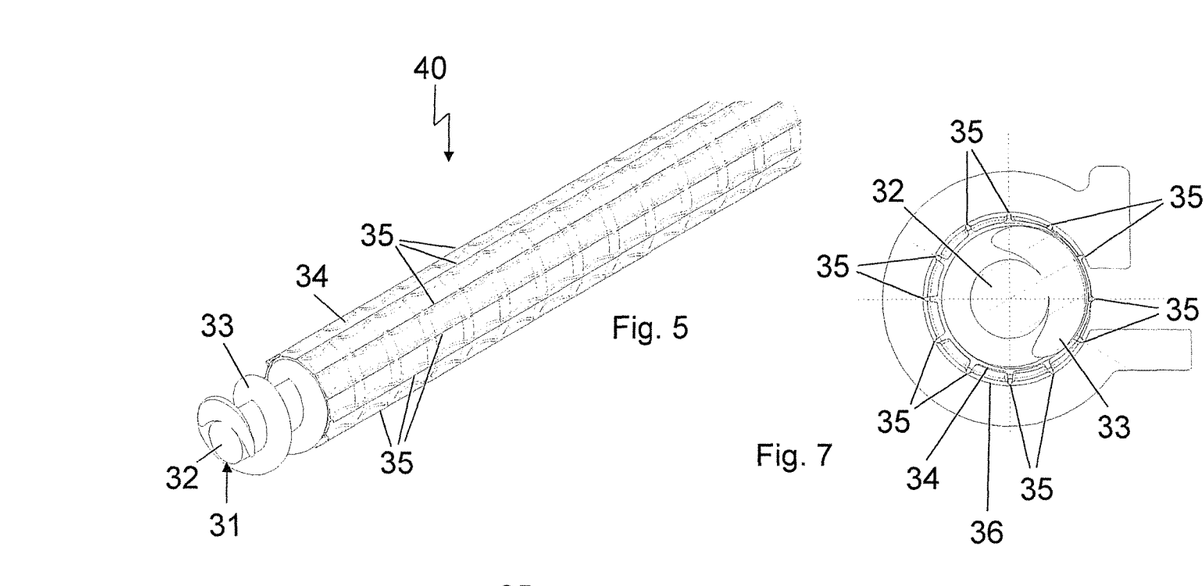
FIG. 5 shows a perspective view of another embodiment of a drive cable according to the invention.
FIG. 7 shows a cross section through the drive cable according to FIG. 5 in a cable channel.
Figure 6:
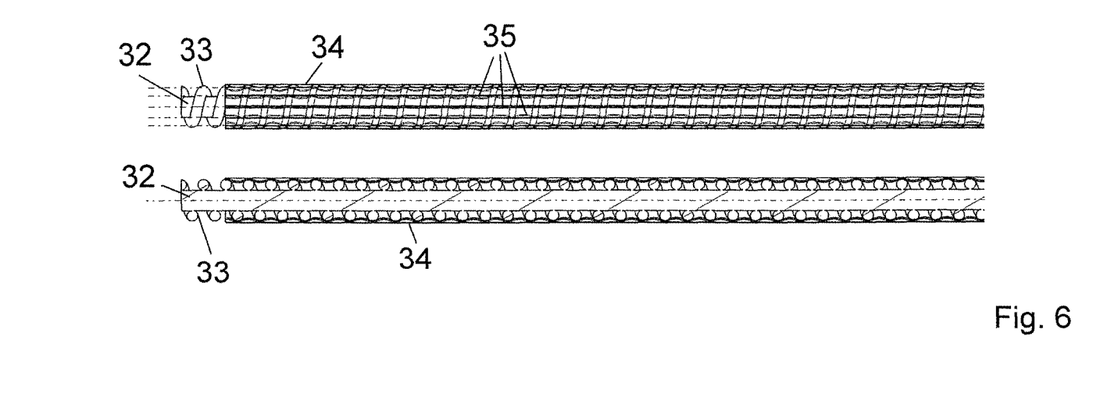
FIG. 6 shows a) a side view of and b) a longitudinal cut through the drive cable according to FIG. 5.

In FIGS. 5 to 7, a drive cable 40 according to the invention is illustrated which mostly corresponds to the drive cable illustrated in FIGS. 2 to 4, except in that it comprises a plastic jacketing 34 which is provided with twelve longitudinal ribs 35 arranged at equal distances to each other on its outer side, said drive cable 40 supporting itself in a guide channel 36 of a cable guide of a sliding roof drive via these longitudinal ribs 35. In all other respects, the drive cable according to FIGS. 5 to 7 corresponds to the drive cable according to FIGS. 2 to 4.

Figure 8:
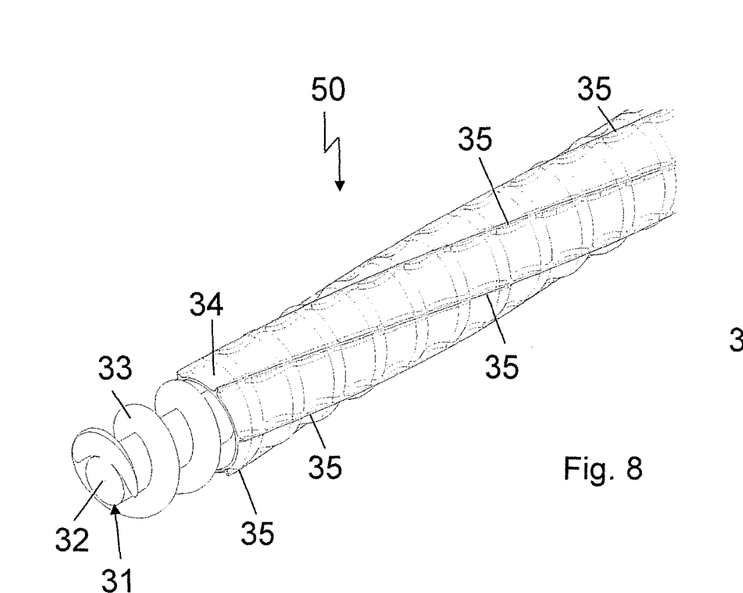
FIG. 8 shows a perspective view of another embodiment of a drive cable according to the invention.
Figure 9:
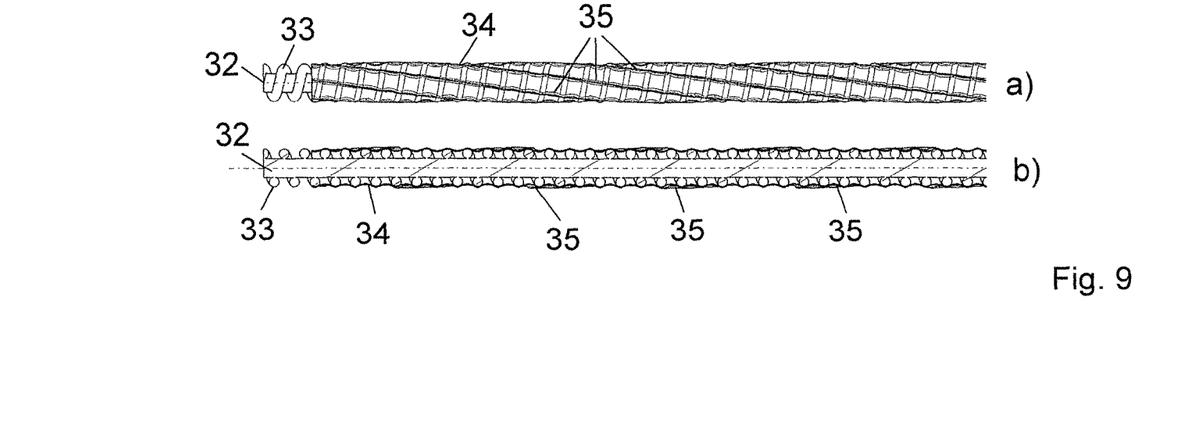
FIG. 9 shows a) a side view of and b) a longitudinal cut through the drive cable according to FIG. 8.
Figure 10:
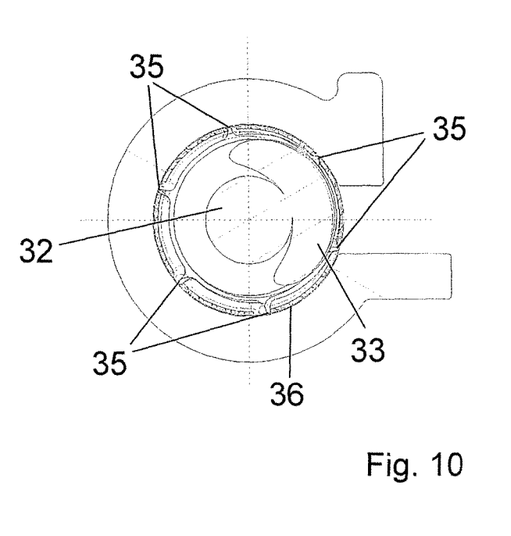
FIG. 10 shows a cross section through the drive cable according to FIG. 8 in a drive channel.

In FIGS. 8 to 10, a drive cable 50 is illustrated which also mostly corresponds to the drive cable illustrated in FIGS. 2 to 4, except in that it comprises a jacketing 34 made of plastically malleable plastic, said jacketing 34 surrounding a cable body 31 made of a cable core 32 and a spiral 33 and comprising six longitudinal ribs 35 arranged at equal distances to each other at its outer side, said longitudinal ribs 35 each following a helical line. The helical lines, which are followed by the longitudinal ribs 35, are arranged inversely to the helical line, which is followed by the spiral 33 of the cable body 31. Moreover, the inclination of the helical line, which is followed by the longitudinal ribs 35, is a multiple of the inclination of the helical line, which is followed by the spiral 33.

In all other respects, the drive cable 50 corresponds to the drive cable according to FIGS. 2 to 4.

Figure 11:
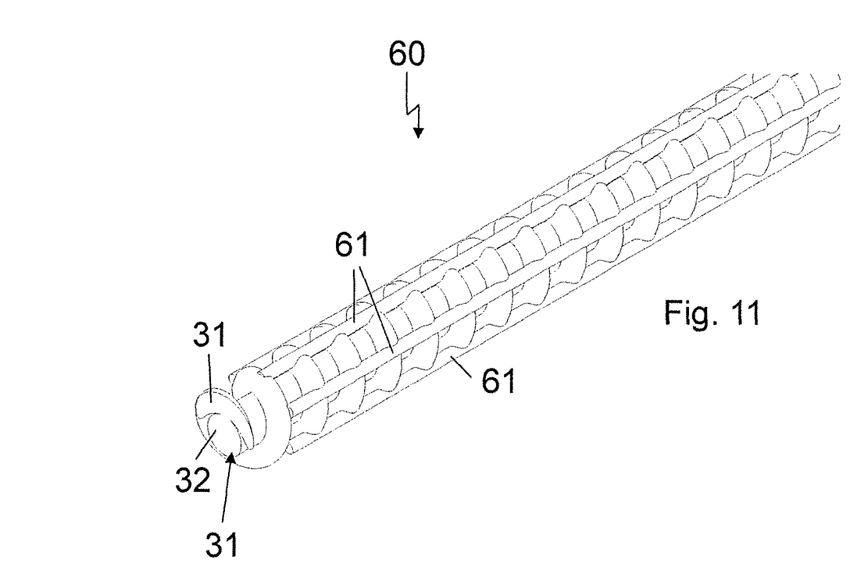
FIG. 11 shows a perspective view of another embodiment of a drive cable according to the invention.
Figure 12:
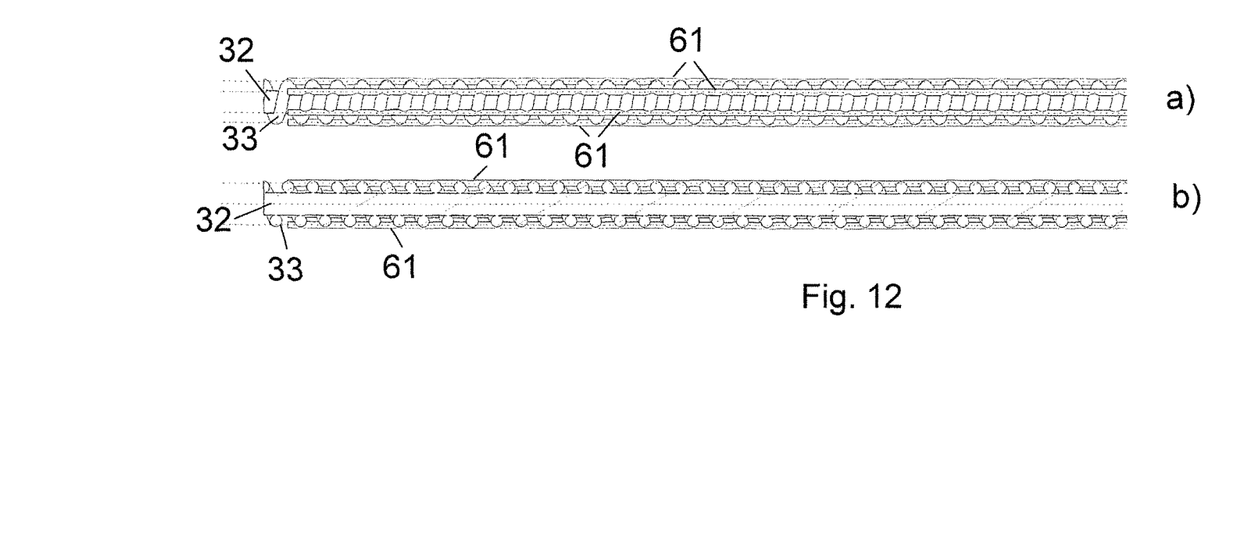
FIG. 12 shows a) a side view of and b) a longitudinal cut through the drive cable according to FIG. 11.
Figure 13:
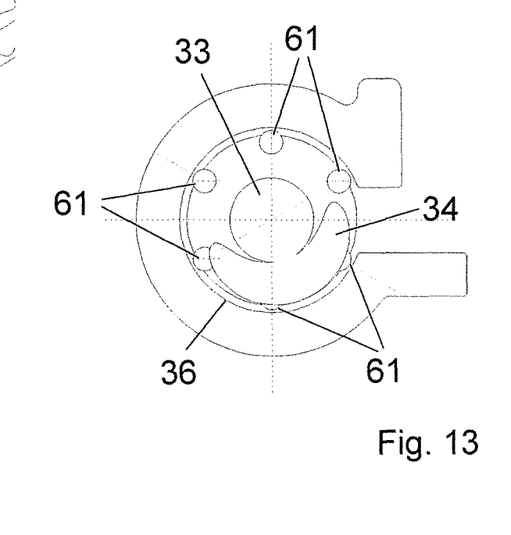
FIG. 13 shows a cross section through the drive cable according to FIG. 11 in a cable channel.

In FIGS. 11 to 13, a drive cable 60 is illustrated which also comprises a flexible cable body 31 made of a cable core 32, which is surrounded by a spiral 33 made of steel wire. In the peripheral direction, six thread-like longitudinal ribs 61, which extend in the axial direction of the cable body 31 and which are each made of a plastically malleable plastic, are formed on the cable body 31. The longitudinal ribs 61, which have an annular cross section, are not a component of a complete jacketing of the cable body 31. Indeed, the individual longitudinal ribs 61 are distanced to each other and are arranged between the individual windings of the spiral 33 with a distance to the cable core 32.

As in the embodiments according to FIGS. 2 to 10, the drive cable 60 is guided in a guide channel 36 via the longitudinal ribs 61, said guide channel 36 being allocated to a roof opening system.

Figure 14:
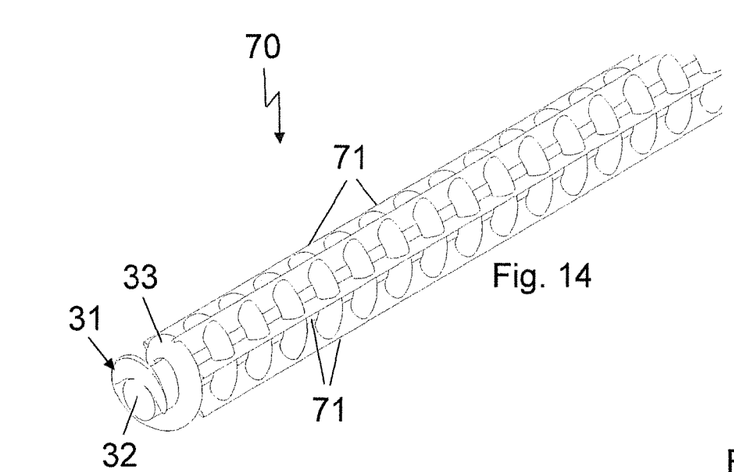
FIG. 14 shows a perspective view of another embodiment of a drive cable according to the invention.
Figure 15:
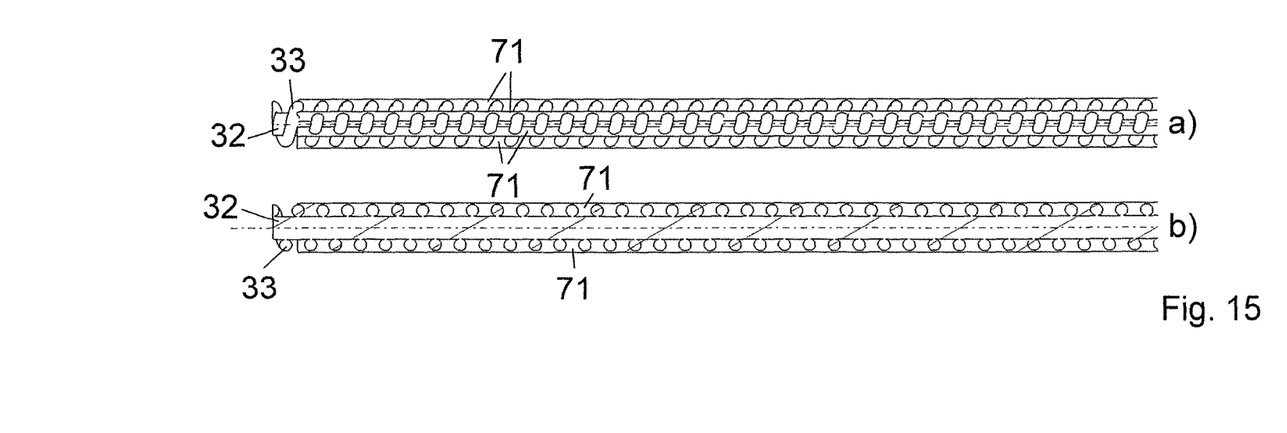
FIG. 15 shows a) a side view of and b) a longitudinal cut through the drive cable according to FIG. 14.
Figure 16:
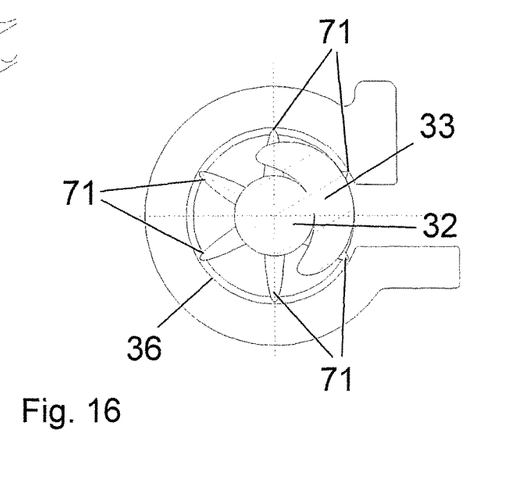
FIG. 16 shows a cross section through the drive cable according to FIG. 14 in a cable channel.

In FIGS. 14 to 16, a drive cable 70 is illustrated which mostly corresponds to the drive cable illustrated in FIGS. 11 to 13, except in that it comprises longitudinal ribs 71 extending in the axial direction, said longitudinal ribs 71 engaging across the windings of the spiral 33 over the length of the drive cable 70 on the one hand and being contacted to the cable core 32 in the gaps between the individual windings of the spiral 33 on the other hand. The longitudinal ribs 71, which also consist of a plastically malleable plastic and via which the drive cable 70 is guided in a guide channel 36, have a parabolis cross section starting from the cable core 32 (cf. FIG. 16).

Figure 17:
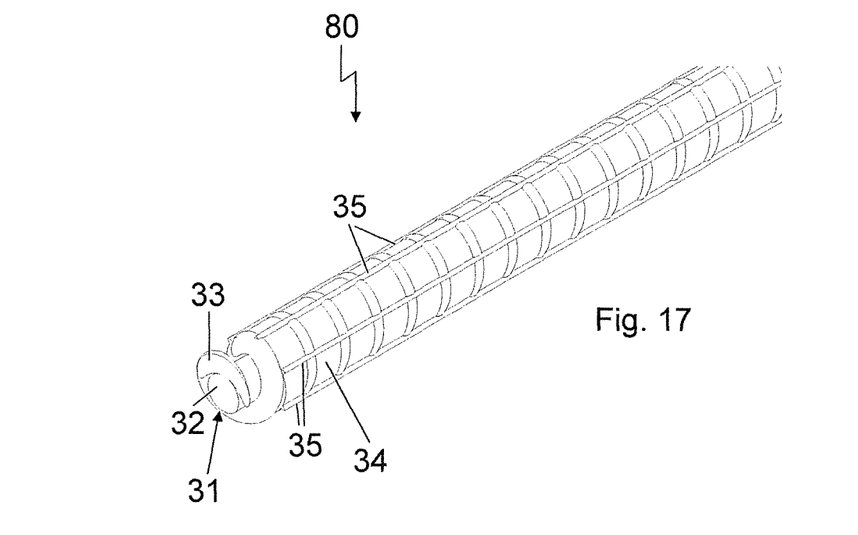
FIG. 17 shows a perspective view of another embodiment of a drive cable according to the invention.
Figure 18:
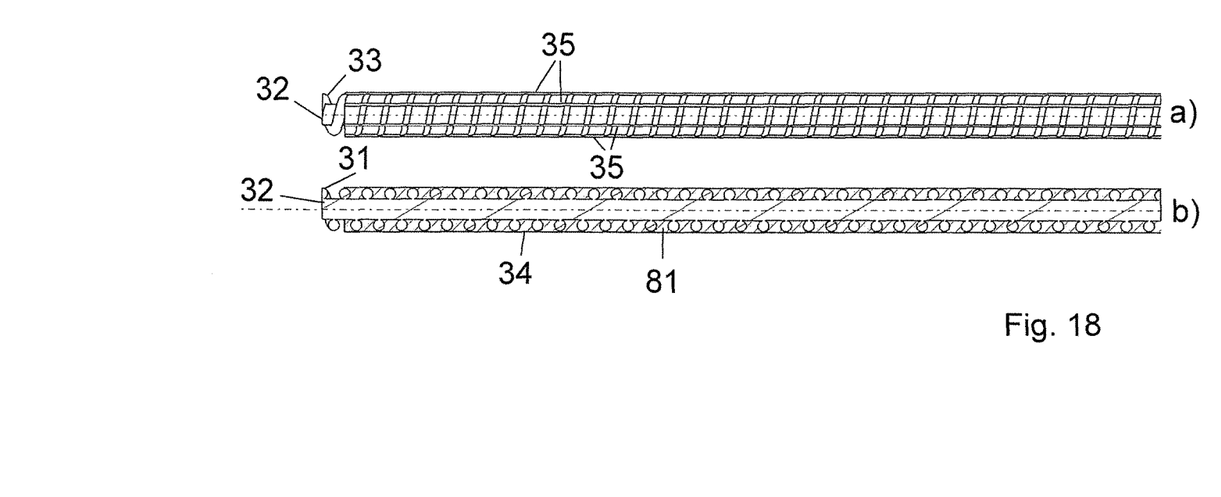
FIG. 18 shows a) a side view of and b) a longitudinal cut through the drive cable according to FIG. 17.
Figure 19:
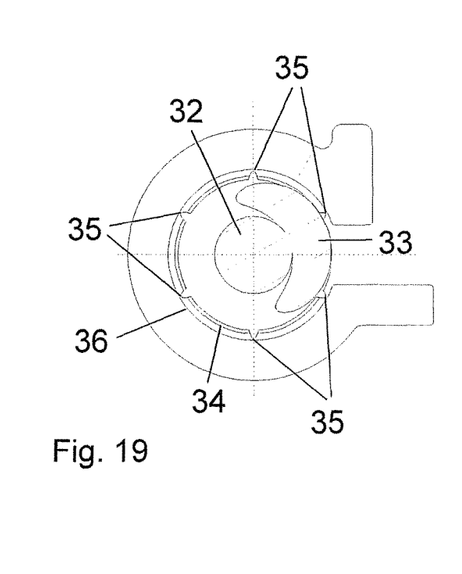
FIG. 19 shows a cross section through the drive cable according to FIG. 17 in a cable channel.

In FIGS. 17 to 19, a drive cable 80 is illustrated which mostly corresponds to the drive cable illustrated in FIGS. 2 to 4, except in that it comprises a filling material 81, which is made of a gel, an open-pored foam or a flock and which fills the gaps between the individual windings of the spiral 33, between its cable body 31, which is made of a cable core 32 and a spiral 33, and its jacketing 34, which carries longitudinal ribs 35 extending in the axial direction.

In all other respects, the drive cable 80 corresponds to the drive cable according to FIGS. 2 to 4.

Figure 20:
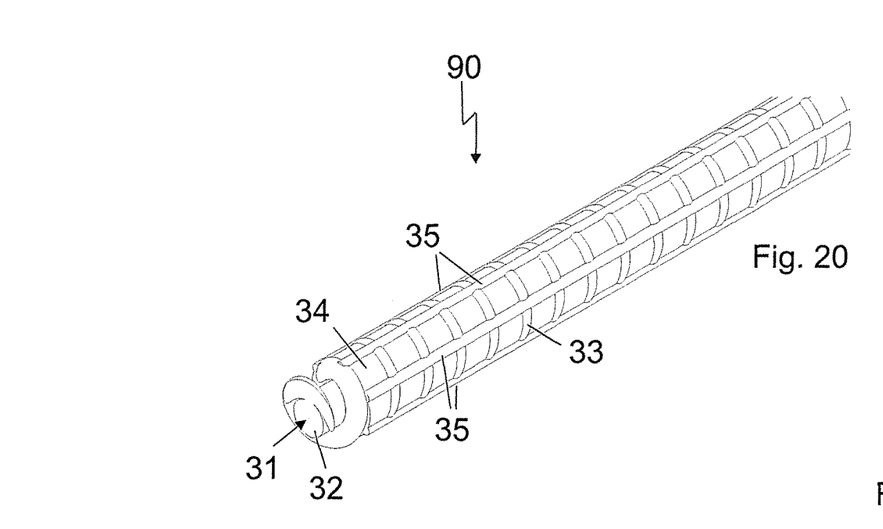
FIG. 20 shows a perspective view of another embodiment of a drive cable according to the invention.
Figure 21:
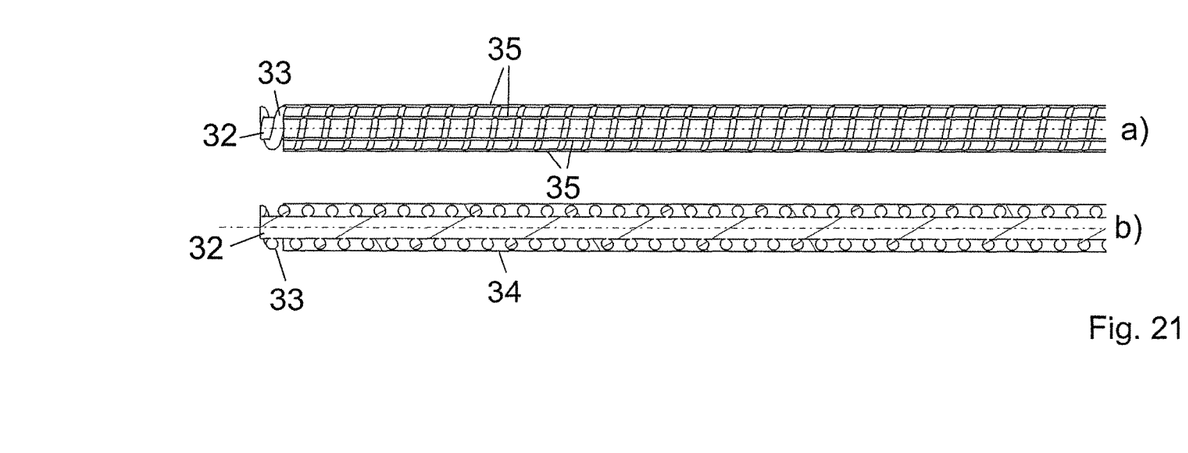
FIG. 21 shows a) a side view of and b) a longitudinal cut through the drive cable according to FIG. 20.
Figure 22:
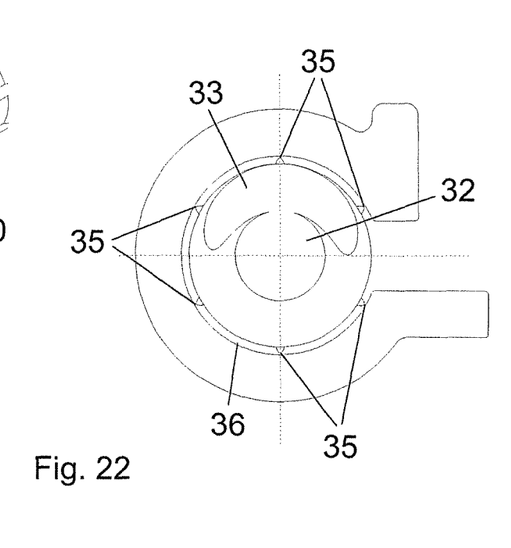
FIG. 22 shows a cross section through the drive cable according to FIG. 20 in a cable channel.

In FIGS. 20 to 22, a drive cable 90 is illustrated which also comprises a cable body 31 which is made of a flexible cable core 32 and a spiral 33 surrounding the cable core 32 along a helical line. The cable body 31 has a jacketing 34 which fills the gaps between the individual paths of the spiral 33. The jacketing 34 is made of an open-celled foaming material and comprises six longitudinal ribs 35 on its outer side, said longitudinal ribs 35 extending in the axial direction of the cable core 32 and engage across the spiral 33. The spiral 33 is free of the jacketing 34 between the longitudinal ribs 35 arranged at equal distances in the peripheral direction.

As in the embodiments described above, the longitudinal ribs 35 of the drive cable 90 also serve for guiding the drive cable 90 in a guide channel or cable channel 36 in a rattle-free and chatter-free manner, said guide channel or cable channel 36 being formed on a guide rail 18A or 18B. In the section in which the drive cable 90 becomes engaged with a drive gearwheel 24 of a drive motor 22, the jacketing 34 is deformed by the drive gearwheel 24 so that the drive gearwheel 24 can mesh with the spiral 33.

In all other respects, the embodiment according to FIGS. 20 to 22 corresponds to the embodiment according to FIGS. 2 to 4.

Figure 23:
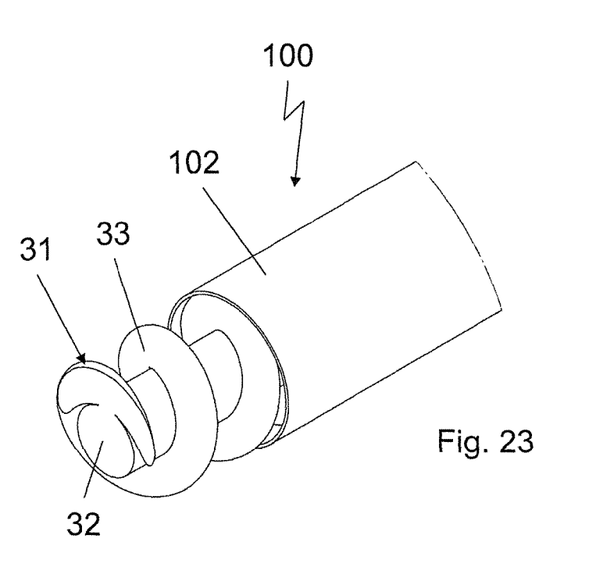
FIG. 23 shows a perspective view of another embodiment of a drive cable according to the invention.
Figure 24:
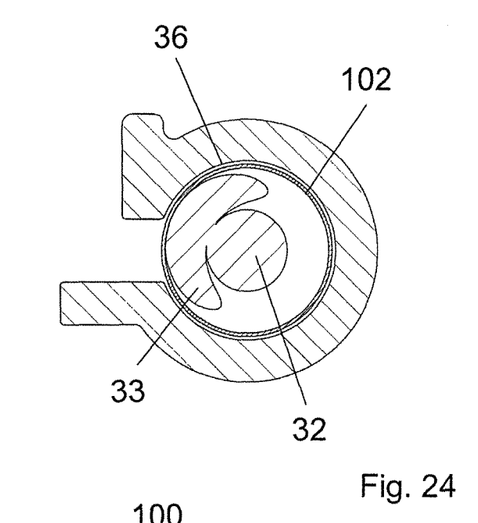
FIG. 24 shows a cross section through the drive cable according to FIG. 23 in a cable channel.
Figure 25:
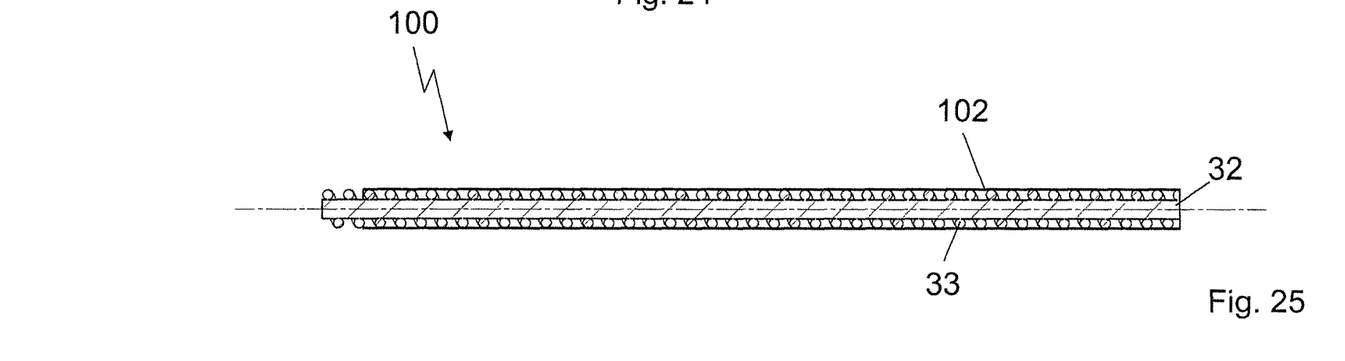
FIG. 25 shows a longitudinal cut through the drive cable according to FIG. 23.

In FIGS. 23 to 25, a drive cable 100 is illustrated which comprises a cable body 31 made of a flexible core 32 and a spiral 33, with which the cable core 32 is wrapped following a helical line. The cable core 32 is made of a one-piece steel wire or a steel braid. The spiral 33 also consists of a steel wire.

The cable body 31, which consists of the cable core 32 and the spiral 33 and which forms a so-called helical cable, is provided with a cable jacket 102 which is a cable sleeve and which is made of a plastic extrusion layer. The cable sheath 102 engages entirely across the cable body 31, i.e. the cable core 32 and the spiral 33, and forms a closed and rib-free jacket surface or guide surface, which also bridges the gaps between the windings of the spiral 33. The guide surface, which is formed by the cable jacket 102 and which corresponds to the peripheral surface of the drive cable 100, is smooth and arranged concentrically with respect to the axis of the drive cable 100.

The cable jacket 102 is made of an elastically malleable plastic so that it has a certain resilience and can resume its smooth form after the drive gearwheel has engaged. The malleability of the cable jacket 102 is required for ensuring a non-slip engagement between the drive gearwheel and the spiral 33.

Figure 26:
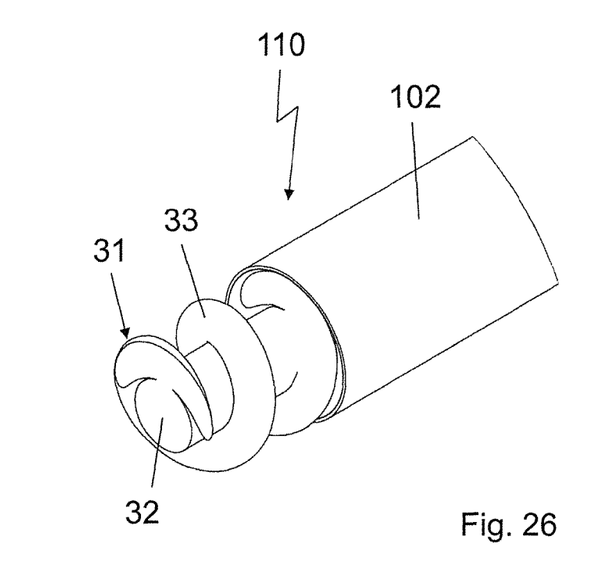
FIG. 26 shows a perspective view of another embodiment of a drive cable according to the invention.
Figure 27:
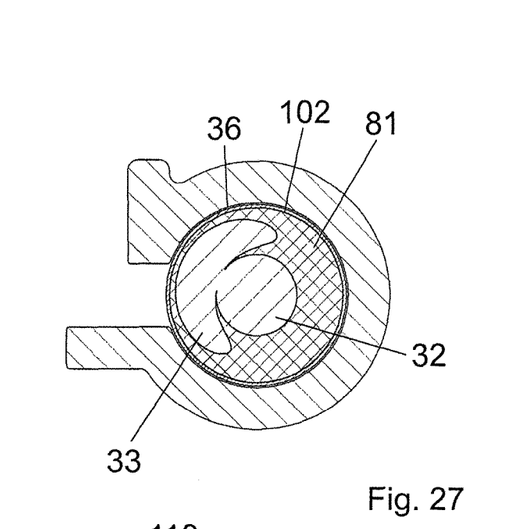
FIG. 27 shows a cross section through the drive cable according to FIG. 26 in a cable channel.
Figure 28:
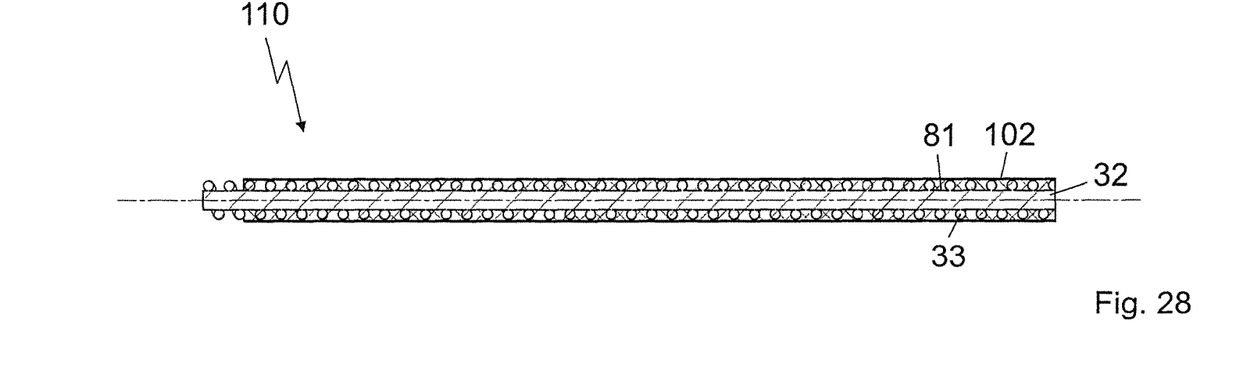
FIG. 28 shows a longitudinal cut through the drive cable according to FIG. 26.

An alternative embodiment of a drive cable 110 is illustrated in FIGS. 26 to 28, said embodiment mostly corresponding to the embodiment illustrated in FIGS. 23 to 25, except in that it comprises a filling material 81 between the cable jacket 102 and the cable body 31 made of the cable core 32 and the spiral 33, said filling material 81 being made of a gel, an open-pored foam or a flock and filling the gaps between the individual windings of the spiral 33.

In all other respects, the drive cable 110 corresponds to the drive cable according to FIGS. 23 to 25.

Figure 29:
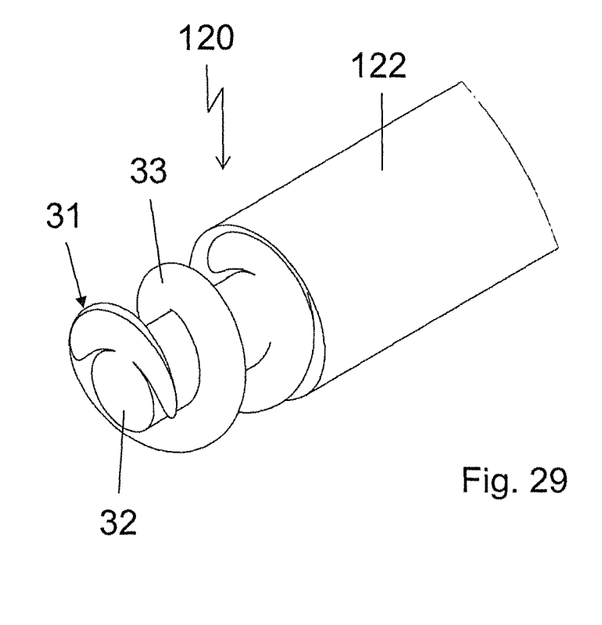
FIG. 29 shows a perspective view of another embodiment of a drive cable according to the invention.
Figure 30:
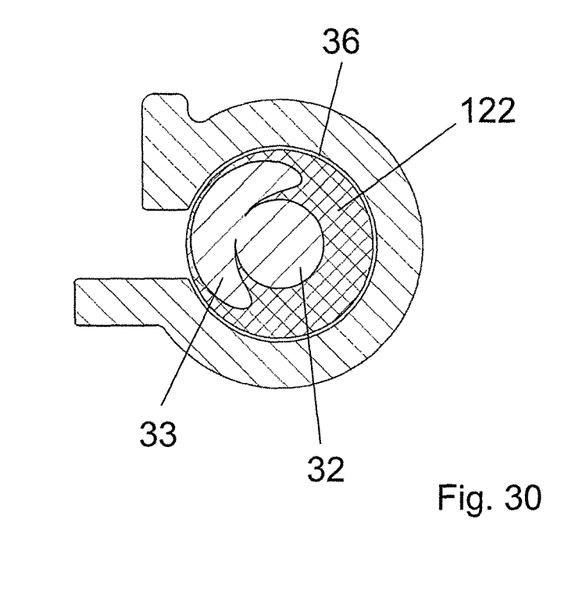
FIG. 30 shows a cross section through the drive cable according to FIG. 29 in a cable channel.
Figure 31:
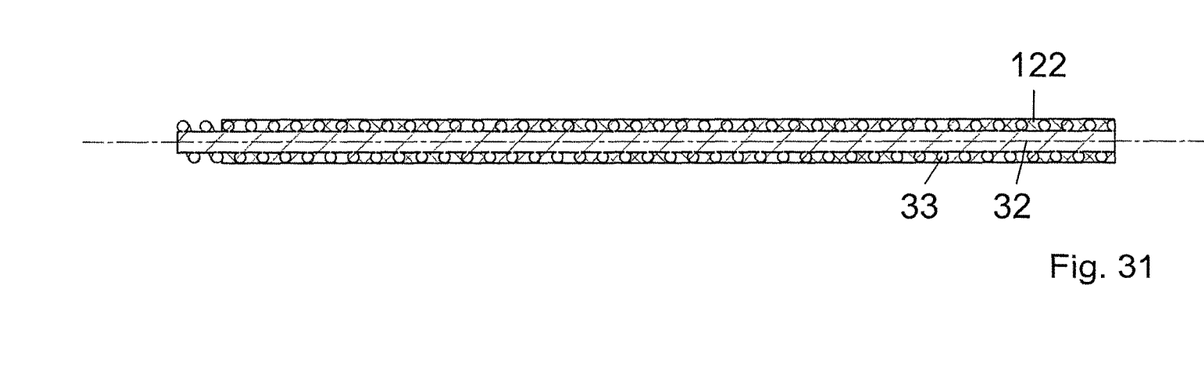
FIG. 31 shows a longitudinal cut through the drive cable according to FIG. 29.

In FIGS. 29 to 31, a drive cable 120 is illustrated which comprises a cable body 31 made of a cable core 32 and a spiral 33 according to the embodiments above, said spiral 33 surrounding the cable core 32 following a helical line. The spiral 33 is made of a steel wire and the cable core 32 can be made of a steel wire or a steel braid.

The drive cable 120 further comprises a cable jacket 122, which is solidly made and which engages across the cable body 31, i.e. the cable core 32 and the spiral 33, in an interlocking manner and which forms a cylindrical and rib-free peripheral surface of the cable with respect to the extended direction of the cable core 32, said peripheral surface being realized smooth and without ribs. The cable jacket 122 is made of an elastically or plastically malleable plastic and forms the guide surface of the drive cable 120 in a guide channel 36 in which the drive cable 120 is guided.

LIST OF REFERENCES 10 vehicle roof
12 roof opening
14 lid element
16A, B drive slider
18A, B guide rail
20A, B guide cable
22 drive motor
24 drive gearwheel
30 drive cable
31 cable body
32 cable core
33 spiral
34 jacketing
35 longitudinal ribs
36 guide channel
40 drive cable
50 drive cable
60 drive cable
61 longitudinal ribs
70 drive cable
71 longitudinal ribs
80 drive cable
81 filling material
90 drive cable
100 drive cable
102 cable jacket
110 drive cable
120 drive cable
122 cable jacket

The invention claimed is:

1. A drive cable for actuating a vehicle element which is movable with respect to a vehicle design, comprising:
   a cable body having a flexible cable core which is wrapped with a spiral which follows a helical line so as to become engaged with a gearwheel,
   wherein at least three longitudinal ribs or fillets are formed along the periphery of the cable body,
   the drive cable being able to support itself in a cable guide via the longitudinal ribs or fillets, which form at least mostly continuous guiding lines and contact lines of the drive cable, each having continuously the same distance to the cable axis, or
   in that an elastically or plastically malleable cable jacket is provided which engages over the cable core and the spiral, the cable jacket forming a cylindrically shaped rib-free peripheral surface when the cable core is stretched,
   the peripheral surface of the cable being arranged concentric with respect to the cable axis.

2. The drive cable according to claim 1, wherein the longitudinal ribs extend parallel to the longitudinal direction of the cable core.

3. The drive cable according to claim 1, wherein the longitudinal ribs each follow a helical line which has a larger inclination than the helical line followed by the spiral.

4. The drive cable according to claim 3, wherein the helical line followed by the longitudinal ribs is arranged inversely to the helical line followed by the spiral.

5. The drive cable according to claim 1, wherein the longitudinal ribs are components of a jacketing of the cable body.

6. The drive cable according to claim 5, wherein the jacketing is an extruded layer.

7. The drive cable according to claim 5, wherein filling material is arranged between the jacketing and the cable body.

8. The drive cable according to claim 7, wherein the filling material comprises a plastically or elastically malleable material which in particular comprises a flock, a gel, a foam, a belt, a cord, a seal cord, a tube or the like, each preferably made of plastic.

9. The drive cable according to claim 5, wherein the jacketing is made of an elastically or malleable plastic.

10. The drive cable according to claim 1, wherein the longitudinal ribs are made of an elastically or malleable plastic.

11. The drive cable according to claim 1, wherein the elastically or plastically malleable cable jacket is realized by a cable sleeve which engages over the spiral.

12. The drive cable according to claim 11, wherein filling material is arranged between the cable sleeve and the cable core.

13. The drive cable according to claim 12, wherein the filling material comprises a plastically or elastically malleable material which in particular comprises at least one of a plastic flock, a gel, a foam, a belt, a cord, a seal cord, and a tube.

14. The drive cable according to claim 1, wherein the elastically or plastically malleable cable jacket surrounds the cable core and the spiral in an interlocking manner and fills gaps between the spiral windings.

15. The drive cable according to claim 1, wherein the elastically or plastically malleable cable jacket comprises an elastically malleable plastic.

16. A drive cable for actuating a vehicle element which is movable with respect to a vehicle design, comprising:
   a cable body having a flexible cable core which is wrapped with a spiral which follows a helical line so as to become engaged with a gearwheel,
   wherein at least three longitudinal ribs or fillets are formed along the periphery of the cable body,
   the drive cable being able to support itself in a cable guide via the longitudinal ribs or fillets, which form at least mostly continuous guiding lines and contact lines of the drive cable, each having continuously the same distance to the cable axis.

17. A drive cable for actuating a vehicle element which is movable with respect to a vehicle design, comprising:
   a cable body having a flexible cable core which is wrapped with a spiral which follows a helical line so as to become engaged with a gearwheel,
   in that an elastically or plastically malleable cable jacket is provided which engages over the cable core and the spiral, the cable jacket forming a cylindrically shaped rib-free peripheral surface when the cable core is stretched,
   the peripheral surface of the cable being arranged concentric with respect to the cable axis.

* * * * *